Oct. 15, 1946.   C. H. JOLLY   2,409,210
ROCKET LAUNCHING DEVICE
Filed June 13, 1945
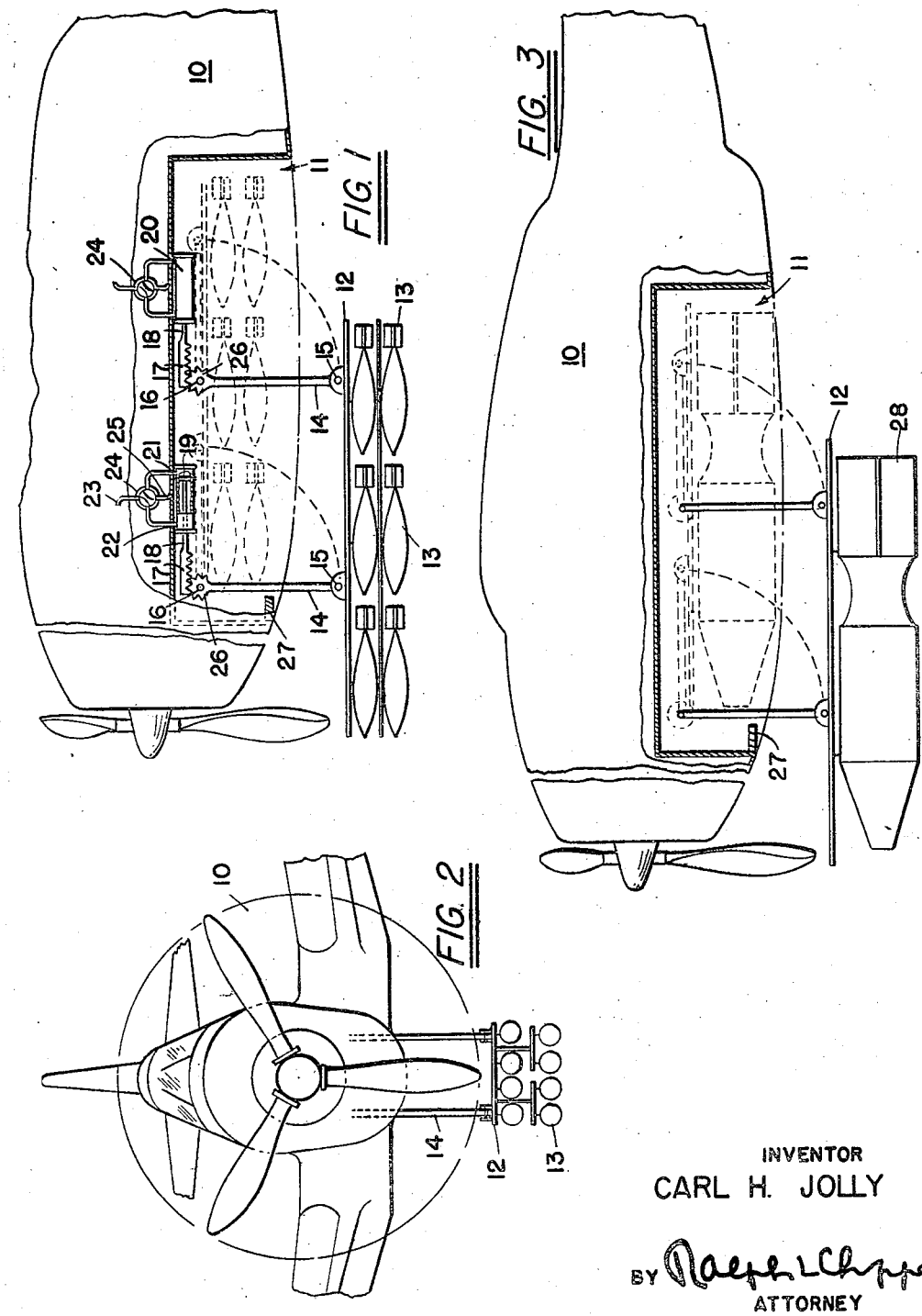
INVENTOR
CARL H. JOLLY
BY *Ralph L Chappell*
ATTORNEY Patented Oct. 15, 1946

2,409,210

UNITED STATES PATENT OFFICE 2,409,210

ROCKET LAUNCHING DEVICE

Carl H. Jolly, United States Navy

Application June 13, 1945, Serial No. 599,293

2 Claims. (Cl. 89—1.7)

(Granted under the act of March 3, 1883, as amended April 30, 1928; 370 O. G. 757)

This invention relates to rocket launching devices for airplanes, and is particularly directed to rocket launchers of the retractable type.

The chief object of the present invention is to provide a rocket carrying airplane with a retractable carriage which is normally within the body of the plane in its retracted position so that the plane's streamlined effect is not disturbed and which when extended, places the rockets in a firing position parallel to the thrust line and outside the propeller arch.

A further object is to provide a device which permits a plane, such as of the TBF type, to carry a greater load of rockets or a larger size rocket torpedo if the plane carries a load torpedo.

Other features of the present invention will be apparent from the following detailed description of some specific embodiments thereof.

Preferred embodiments of the present invention will be hereinafter described, with reference to the accompanying drawing, wherein like numerals refer to like parts, and in which:

Fig. 1 is a view in side elevation of a portion of an airplane showing the retractable rocket carrying device with rockets in position, the device being in its extended position and in partial section;

Fig. 2 is a front view showing the device in its extended position; and

Fig. 3 shows the present invention with a large size rocket torpedo releasably mounted on the carriage.

Referring to Figs. 1 and 2, the retractable rocket carrying device which is normally housed within an open bay 11 in the bottom portion of the airplane 10 consists in general of a carriage 12 for carrying one or more rockets 13, a plurality of strut members 14, 14 for positioning the carriage 12 in a retracted position while the plane is in flight, or in an extended position when the rockets are to be fired, and a hydraulically operated pinion and gear rack mechanism, hereinafter described for operating the device.

A plurality of rockets 13 are releasably mounted on the underside of the carriage 12 in the customary manner so that when the retractable device is in an extended position the rockets may be set off by firing mechanism (not shown), causing them to leave the carriage 12 and to travel in a line parallel to the flight of the airplane. Since the invention consists of two identical structures in the construction and operation of the strut members 14, 14, and the hydraulically operated pinion and gear rack mechanisms, the hereinafter description of one set will be applicable to the other; both structures being operably connected to each end of the carriage 12 and operated simultaneously.

The carriage 12 is pivotally mounted to the struts 14 at 15. The strut 14, which is of such length that in its extended position the rockets are carried outside the propeller arch, is likewise pivotally mounted at its upper end at 16 and has a segment pinion gear 26 extending upwardly therefrom. The pinion gear 26 is engaged to a gear rack 17, one end being fixed to the piston rod 18 with a piston 19 mounted at its free end. The piston 19 is slidably positioned in a cylinder 20 rigidly mounted on the chassis of the airplane and having two ports 21, 22 along the side walls at each end thereof.

Each of the ports 21, 22 are connected to a rotatable reversing valve member 24 to which an outlet passage 25 and an inlet passage 23 are connected; the inlet passage 23 communicating with a source of fluid under pressure (not shown). The valve proper 24 has two passages therein permitting fluid under pressure to enter the inlet port 22 in the position shown to force the piston to travel in a direction away from the segment pinion gear 26 and at the same time, the fluid in the cylinder 20 on the opposite side of the piston is exhausted through the port 25 by means of the port 21 and the second passageway in the valve 24. This position of the rotatable valve 24 causes the pinion gears 26, 26 to rotate in a clockwise direction and the struts 14, 14 to swing downwardly bringing the carriage 12 down to its extended position.

In order to swing the rocket carrying carriage 12 back to its retracted position, the valve 24 is rotated counter-clockwise so that the passage in the reversing valve 24 permits the port 22 to communicate with the exhaust port 25 and the port 21 to be in communication with the source of fluid under pressure in the inlet passage 23. The piston 19 and the gear rack 17 will move in a direction toward the pinion gear 16 causing the pinion gear 16 to rotate in a counter-clockwise direction and the strut 14 with the carriage 12 to swing upwardly to its retracted position completely housed within the bay 11.

An abutment 27, extending rearwardly from the forward edge of bomb bay 11, acts as a stop for the forward strut 14 to prevent the carriage from swinging beyond its normal extended position. The control valves 24 may be situated in the plane where it is convenient for operation or they may be operated by a remote control mechanism. Also, the two valves 24 may be interconnected so that operation of one will cause the second valve to operate in the same manner.

In Fig. 3 the invention shown is identical in construction and operation to that shown in Figs. 1 and 2, except that the carriage 12 is constructed to carry a single large sized rocket torpedo 28. This invention permits an airplane to carry a torpedo larger in size than normal for the reason that since the torpedo is housed in flight, no additional wind resistance is created, and the weight and size of the rocket carried is limited only by the load capacity of the plane. In those cases wherein a plane carries rockets or torpedoes on the outside of the plane while in flight, the increased wind resistance caused by the exposed rockets decreases the load carrying capacity of the airplane.

While the form of mechanism herein shown and described constitute a preferred form of embodiment of the present invention, it is to be understood that other forms might be adopted, all coming within the scope of the claims which follow.

The invention described herein may be manufactured and used by or for the Government of the United States of America for governmental purposes without the payment of any royalties thereon or therefor.

What I claim is:

1. A device of the class described comprising an open bay in the bottom portion of the body of an airplane, a carriage normally positioned in said bay, one or more rockets releasably mounted on the underside of said carriage, a strut member pivotally mounted at one end on said carriage and at the other end in the upper portion within said bay, said strut member being of such length to position the carriage beyond the propeller arch in line of travel parallel to the airplane thrust line, a pinion gear rigidly attached to said strut member, a gear rack engaging said pinion gear, and hydraulic means for operating said pinion and rack mechanism to swing said carriage to its extended position.

2. In a retractable rocket launching device for airplanes, a carriage for releasably carrying one or more rockets, a pair of strut members pivotally mounted on said carriage, the strut members of such length to position the carriage outside the propeller arch in line of travel parallel to the airplane thrust line, a bay in said airplane of sufficient size to completely house the carriage and rockets, means pivoting said strut members at their upper ends in said bomb bay, a segment pinion gear rigidly attached to each of the upper ends of said struts, gear racks engaging said pinion gears, piston rods mounted on the free end of each of said gear racks, pistons rigidly mounted on the free ends of said piston rods and slidably positioned in cylinders, a port situated at each end of each of said cylinders, rotatable valve means permitting one of said ports on each of said cylinders to communicate with a source of fluid under pressure with said valve means in one position and the other of said ports on said cylinder communicating with said source of fluid pressure with said valve means in another position.

CARL H. JOLLY.